(12) United States Patent
Slakhorst et al.

(10) Patent No.: US 8,820,170 B2
(45) Date of Patent: Sep. 2, 2014

(54) PRESSURE SENSOR

(75) Inventors: Rob Slakhorst, Almelo (NL); Gerard Klaasse, Apeldoorn (NL); Erik Hop, Apeldoorn (NL); Arnout van den Bos, Deurningen (NL); Wico Hopman, Enschede (NL)

(73) Assignee: Sensata Technologies, Inc., Attleboro, MA (US)

( * ) Notice: Subject to any disclaimer, the term of this patent is extended or adjusted under 35 U.S.C. 154(b) by 179 days.

(21) Appl. No.: 13/615,783

(22) Filed: Sep. 14, 2012

(65) Prior Publication Data

US 2014/0076057 A1     Mar. 20, 2014

(51) Int. Cl.
*G01L 7/08*     (2006.01)
*G01L 9/00*     (2006.01)

(52) U.S. Cl.
USPC ............ 73/715; 73/700; 73/753; 73/754

(58) Field of Classification Search
None
See application file for complete search history.

(56) References Cited

U.S. PATENT DOCUMENTS

| | | | |
|---|---|---|---|
| 7,518,234 B1 * | 4/2009 | Okojie | 257/710 |
| 7,726,197 B2 * | 6/2010 | Selvan et al. | 73/777 |
| 7,775,119 B1 * | 8/2010 | Suminto et al. | 73/727 |
| 8,215,176 B2 * | 7/2012 | Ding et al. | 73/721 |
| 8,627,559 B2 * | 1/2014 | Suminto et al. | 29/595 |
| 2008/0222884 A1 | 9/2008 | Bradley et al. | |
| 2009/0071260 A1 | 3/2009 | Speldrich | |

FOREIGN PATENT DOCUMENTS

EP     1826543 A2     8/2007

OTHER PUBLICATIONS

European Search Report from corresponding EP application No. 13184453.2, mailed Jan. 14, 2014, total pp. 6.

* cited by examiner

*Primary Examiner* — Lisa Caputo
*Assistant Examiner* — Jermaine Jenkins
(74) *Attorney, Agent, or Firm* — Chapin IP Law, LLC

(57) ABSTRACT

Techniques disclosed herein include systems and methods for pressure measurement of fluids including vehicular fluids. The pressure sensor includes a MEMS die for pressure measurement. The MEMS die is attached to a glass pedestal member. The pedestal member is mechanically held in place via a mounting frame that attachable to a pressure port of a fluid-containing enclosure. Techniques herein provide a strong connection of a MEMS die to a pressure sensor while decoupling thermal expansion stress from the MEMS die. With such decoupling techniques, pressure sensing reliability and accuracy can be improved. With thermal expansion stress decoupled from the MEMS die, sensor sealing materials can be selected for their robust chemical properties instead of structural properties. Such techniques provide an accurate, durable, and cost-effective pressure sensor.

24 Claims, 3 Drawing Sheets

PRESSURE SENSOR

RELATED APPLICATIONS

This application is related to U.S. patent application Ser. No. 13/615,764 entitled "HEREMETICALLY GLASS SEALED PRESSURE SENSOR," filed on the same date herewith. The entire teachings and contents of this patent application is hereby incorporated by reference herein in its entirety.

BACKGROUND

The present disclosure relates to pressure sensor devices, and particularly to devices that identify changes in fluid pressure.

Pressure sensors typically measure absolute or relative pressure of fluids such as gasses or liquids. Measurement of fluids enables accurate control and monitoring of various devices and systems. There are various sensor devices using any of multiple available mechanisms of action for measuring pressure. For example, given sensor devices can use piezoelectric, piezoresistive, optical, electromagnetic, and other technologies for measuring pressure. Some pressure sensors are being manufactured at very small sizes. For example, microelectromechanical systems (MEMS) are now being used as pressure sensors. The main function of a MEMS sensor is to transfer a pressure signal into an electrical output signal based on an absolute or differential pressure input combined with offering an electrical base signal. Such relatively small pressure sensors are useful in systems where size and weight are valid considerations.

SUMMARY

Using MEMS technology in pressure sensing technologies can be beneficial because of the small footprint of MEMS devices relative to conventional pressure sensing technologies. As such, MEMS devices are suitable for applications having size constraints such as automotive transmissions including dual clutch transmission (DCT) systems. A challenge with MEMS pressure sensing devices, however, is creating a cost-efficient as well as a robust assembly or package. Conventional MEMS pressure sensors can be relatively expensive and lose accuracy or even fail under certain operating conditions including high temperature, thermal expansion, and chemical deterioration. For example, conventional MEMS pressure sensors are costly due to the number and type of parts, and the use of precious metals such as gold for improving bonding capabilities. A MEMS sensing element should be sealed chemically from a sensed media (such as fluid or oil pressure). Also, with conventional components made of varied materials, there is a mismatch in coefficients of thermal expansion (CTE). The result of such a mismatch is that thermal conditions can break down a chemical seal due to thermal stress build-up and/or apply excessive expansive stress to a MEMS sensing element.

One challenge with using MEMS pressure sensing elements is determining how to attach a MEMS die to a substrate to result in a sufficiently strong connection (physical attachment), but while enabling accurate pressure readings. A strong connection and good accuracy can be competing interests. With a strong connection there is always a corresponding level of stress that can be undesirable. For example, relatively high temperatures can induce stress through a MEMS die attachment bond. A strong connection translates these stresses to the die, affecting accuracy of pressure measurement. Conventional pressure sensors use metal alloy pedestals bonded to a MEMS die using a strong and stiff epoxy. Such metal alloy use is expensive and can compromise accuracy because of a significant difference in coefficient of thermal expansion values between the metal alloy material and the MEMS die. Conventional MEMS dies can also be manufactured with an integrated glass pedestal attached to the MEMS die during the wafer fabrication process. Such integrated glass pedestals are relatively expensive, and are conventionally bonded to a metal alloy base Techniques disclosed herein provide a strong connection of the MEMS die to a pressure sensor but while decoupling thermal expansion stress from the MEMS die. With such decoupling techniques, pressure sensing accuracy can exceed 99%. For example, techniques herein can use a glass pedestal having a tube or defining a fluid conduit. Moreover, instead of chemically bonding a metal pedestal to a mounting plate, the glass pedestal herein is held in place mechanically using a physical structure of a mounting frame. A portion of the glass pedestal is accessible from an exterior side of the mounting frame, or, alternatively, a portion of the glass pedestal protrudes from the mounting frame to enable MEMS die attachment. The MEMS die can then be attached to the glass pedestal using a glass paste. This glass paste forms a strong connection that is thermal expansion matched to the glass pedestal and MEMS die. With such a configuration, thermal expansion of the mounting frame is not a concern and thus the mounting frame does not need to be selected from a material with a similar coefficient of thermal expansion of the MEMs die. With some techniques, the glass pedestal can be inserted from below the mounting frame to form a compression seal. The MEMS die can be affixed either before or after such insertion in or partially through the mounting frame. In contrast, conventional sensors bond a metal alloy pedestal above a mounting plate and over an opening. With techniques herein, however, the mounting frame structure itself keeps the glass pedestal in position either by use of flanges, narrowing opening, or otherwise, and the glass pedestal is essentially below the mounting frame instead of being affixed above a mounting plate. With the glass pedestal held mechanically, as disclosed herein, a sealant used to keep a fluid medium out of the pressure sensor can be selected to have chemically robust properties, and can also be relatively flexible because this sealant does not need to withstand mechanical forces of the fluid medium.

One embodiment includes a pressure sensor device for measuring pressure of a fluid. The pressure sensor device has several components including a mounting frame or housing attachable to a pressure port of a fluid-containing enclosure. The mounting frame has an interior side for facing the fluid-containing enclosure, as well as an exterior side for facing away from the fluid-containing enclosure. The mounting frame defines an opening that extends from the interior side to the exterior side. Another component is a pedestal member positioned at the opening such that the pedestal member is in contact with a portion of the interior side of the mounting frame such that the mounting frame prevents the pedestal member from completely passing through the opening as if moving from the interior side to the exterior side. The pedestal member defines a fluid conduit extending completely through the pedestal member. The pedestal member is positioned such that the fluid conduit and a surface area of the pedestal member, through which the fluid conduit exits or fills, are accessible from the exterior side of the mounting frame. Another component is a microelectromechanical system (MEMS) die or element attached to the pedestal member at the surface area of the pedestal member. The MEMS die is attached such that when the fluid conduit is filled with fluid from the fluid-containing enclosure, the fluid presses against the MEMS die for monitoring fluid pressure. In other embodiments, the pedestal member, MEMS die and a bonding material between the pedestal member and the MEMS die all have an approximately matched coefficient of thermal expansion.

In another embodiment, a rigid seal comprising solder glass is disposed between the pedestal member and the MEMS die. The rigid seal has an opening such that the fluid contacts a portion of the MEMS die and the rigid seal preventing fluid from exiting the pressure sensor.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
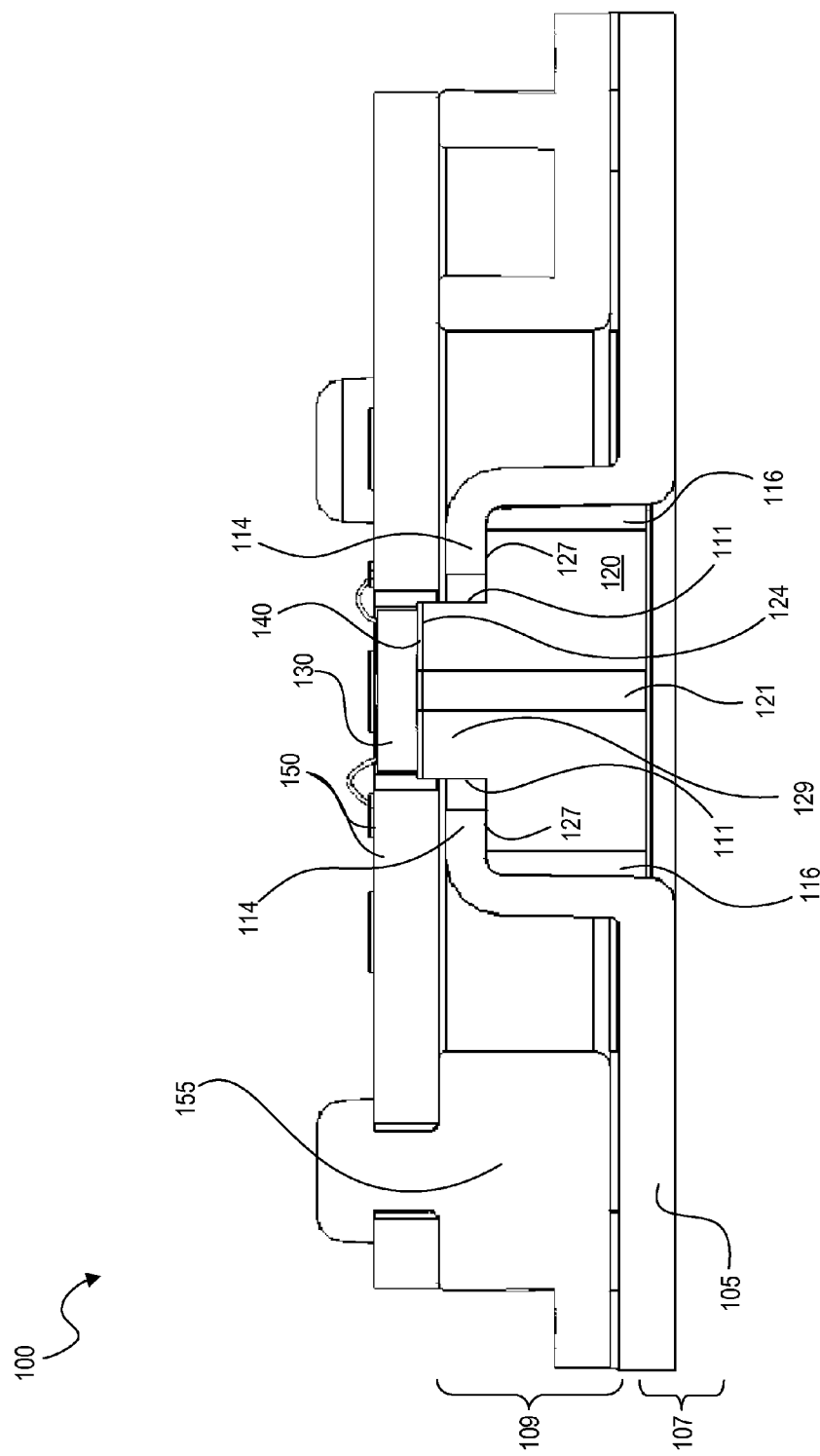
FIG. 1 is a cross-sectional side view of a pressure sensor according to embodiments herein.

Techniques disclosed herein include systems and methods for a pressure sensor. Pressure sensors herein can be used for measuring various types of fluid media including, but not limited to, air, oil, water, fuel, etc. Embodiments herein are especially useful for measuring oil pressure in automotive transmissions including dual clutch transmissions (DCT). For convenience in explaining the various embodiments herein, this disclosure will primarily reference a sensor device for used with a DCT. Such an application, however, is not limiting and pressure sensors herein can apply to other applications as well, especially to applications where size of the sensor is a valid consideration. In a DCT, there are several pressure sensors, and accurate pressure measurement at the clutches improves the smoothness of shifting and the driving experience.

For dual clutch transmission (DCT) applications, a relatively small pressure sensor is very beneficial, as are other aspects such as functionality, robustness and price. The inherently small footprint of a microelectromechanical systems (MEMS) die (electronic circuit) is beneficial to achieve a reduced-size sensor. For a very small (2×2 mm or smaller) sensing element, a significant challenge is to design and manufacture a robust assembly/package. Conventional pressure sensors using a MEMS sensing element typically use either a glass to metal solder bond or an epoxy to connect the MEMS element to a supporting assembly. Techniques disclosed herein connect a backside exposed MEMS element to a glass material mechanically held by a port/flange of a mounting frame and also sealed using an adhesive bond. A matched glass seal bonds a MEMS element to a borosilicate tube or other glass pedestal member.

In some embodiments, a relatively low-cost borosilicate glass tubes or blocks having conduits are used as an interface between the MEMS die and a metal mounting frame. The configuration of the mounting frame separates functions of chemical and mechanical strength as much as possible. A chemically resistant epoxy or other adhesive can provide a sufficient seal for transmission applications. Other bonding and/or sealing agents can be selected for harsher media such as fuels. The metallic mounting frame forms or defines a mechanical interface with a glass tube or pedestal component. A hole in the mounting frame enables the MEMS die to protrude (or be exposed) while the mounting frame supports the glass pedestal around the MEMS die. In such a configuration, a bond strength of a sealant between the glass pedestal and the mounting frame is less dependent on the mechanical properties of the epoxy or other adhesive material, which means that a given bond can be optimized for chemical robustness instead of mechanical strength. Because the adhesive is not exposed to a tensile force, the adhesive is primarily used for sealing the glass tube or glass pedestal member to a metal flange or other resistive structure of the mounting frame. Such a mechanical interface also lowers a possibility of a bond failing due to chemical degradation of the bond from aging and chemical effects. Such techniques result in a pressure sensor that is more reliable than conventional pressure sensors (having a MEMS directly attached with epoxy to the port). Another advantage of such techniques is that adhesive selection can compensate for the mismatches in coefficients of thermal expansion between the pedestal member and the mounting frame. The use of a metal or metal alloy mounting frame material is advantageous because such material selection can be completely matched with a material counterpart or base plate of a given automotive transmission housing at a pressure point attachment location. In some embodiments, however, the seal layer can have a sufficient thickness to affect other components. In such embodiments, a coefficient of thermal expansion of the seal layer can be matched with that of the MEMS die, a rigid seal, and pedestal member. With the mounting frame mechanically holding a pedestal member, a glass seal can be used for bonding the pedestal member and a MEMS die. The glass seal, the pedestal member and the MEMS die can all be thermally matched (i.e., having similar coefficient of thermal expansion values). This is a significant benefit because conventional metal alloy pedestals can have a coefficient of thermal expansion value that differs from the MEMS die by more than 50%.

Referring now to FIG. 1, a cross-sectional side view of an example pressure sensor device 100 for measuring pressure of a fluid is shown. A mounting frame 105 is attachable to a pressure port of a fluid-containing enclosure. The fluid-containing enclosure and corresponding pressure port are not shown. The fluid containing enclosure can be an automotive transmission housing, fluid tank, etc. Exemplary media can be gasses or liquids including oils. The mounting frame 105 has an interior portion or interior side 107 for facing the fluid-containing enclosure. The mounting frame 105 has an exterior side 109 that faces away from the fluid-containing enclosure (or port of the fluid containing enclosure) when the pressure sensor device 100 is mounted to the-fluid containing enclosure. The mounting frame 105 defines an opening 111 that extends from the interior side 107 to the exterior side 109. As shown in FIG. 1, the opening 111 is defined as part of a recessed portion of mounting frame 105. Note that such a configuration is not limiting and the opening can be flush or inline with the mounting frame 105, that is, with no recessed portion. In alternative embodiments, the mounting frame 105 can include a support structure that extends above the interior side 107 to form a bracket or socket or lateral support.

Note that the mounting frame being attachable to a pressure port can be either directly attached or indirectly attached. For example, the pressure sensor device 100 can include a threaded section and/or be contained or nested within a housing that physically attaches to the pressure port or fluid-containing enclosure, while the pressure sensor device 100 fits within the housing.

A pedestal member 120 is positioned at the opening 111 and is in contact with a portion of interior side 107 of the mounting frame 105 such that the mounting frame 105 prevents the pedestal member 120 from completely passing through the opening as if traveling from the interior side 107 towards to the exterior side 109. The pedestal member 120 defines a fluid conduit 121 extending completely through the pedestal member 120. The pedestal member 120 is positioned such that the fluid conduit 121 and a surface area 124 of the pedestal member—through which the fluid conduit exits—are accessible from the exterior side 109 of the mounting frame 105. The pedestal member 120 can be created from one or more materials having a coefficient of thermal expansion that is close to a coefficient of thermal expansion of a MEMS die. By way of a non-limiting example, pedestal member 120 can be made of glass and shaped with various geometries depending on a particular application. In one embodiment, the pedestal member 120 has as a cylindrical shape with an upper portion 129. Other geometries are possible that still provide sufficient material to define a fluid conduit 121 that can extend through the opening 111 when pedestal member 120 is in contact with mounting frame 105.

A microelectromechanical system (MEMS) die 130 is attached to the pedestal member 120 at the surface area 124 of the pedestal member 120 such that when the fluid conduit 121 is filled with fluid from the fluid-containing enclosure (originating from the interior side 107), the fluid presses against the MEMS die 130. With fluid pressed against the MEMS die 130, the pressure sensor device 100 can monitor and detect changes in fluid pressure. The MEMS die can be attached to the pedestal member using a rigid seal 140. The rigid seal 140 includes an opening 141 (FIG. 2) where fluid can pass through and reach a portion of the MEMS die. The rigid seal 140 prevents fluid escaping around the MEMS die and preventing fluid from exiting the pressure sensor device 100 on the exterior side 109 thereby preventing contamination. The rigid seal 140 can have a first coefficient of thermal expansion and the MEMS die can have a second coefficient of thermal expansion. These coefficients of thermal expansion can both have a value within a predetermined range of coefficient of thermal expansion values, thereby having similar thermal expansion properties. The rigid seal 140 can be created from either solder glass, eutectic bonding, anodic bonding, fusion bonding, epoxy bonding, or similar techniques. In one embodiment using solder glass, the rigid seal 140 can be set by heating the components to around 450 degrees Celsius, which is much lower than the maximum temperature that the MEMS die 130 can withstand. The solder glass can be applied using a paste and/or dispensing or by screen printing. By using a borosilicate glass pedestal member 120, a silicon MEMS die 130 can be directly attached to this tube or pedestal member, thereby eliminating a need for a relatively costly glass pedestal fused on the die level during wafer fabrication. In alternative embodiments, such as in applications having very high accuracy demands, the MEMS die 130 can include an optional glass pedestal (not shown) fused on the die level to lower forces caused by a small coefficient of thermal expansion mismatch between the solder glass and the silicon.

The pedestal member 120 can be attached to the mounting frame 105 using an adhesive seal 116. This adhesive seal 116 can be flexible relative to the rigid seal 140 that attaches the MEMS die 130 to the pedestal member 120. Coefficients of thermal expansion of the pedestal member 120, MEMS die 130, and rigid seal 140 can all be within a predetermined range of coefficient of thermal expansion values. For example, materials can be selected such that the CTE difference between the MEMS die and the pedestal member is less than about 2.0 ppm/(degrees) K. When the seal layer is thicker than 200 um, the CTE of the seal is a factor. In this case, the CTE of MEMS die 130, rigid seal 140 and pedestal member 120 should have a maximum difference of 2.0 ppm/K. For example, in one embodiment with a thicker seal layer, the CTE value of the rigid seal 140 is about 3.0 ppm/K, the pedestal member 120 is Pyrex® 7740 borosilicate glass with a CTE of about 3.25 and the MEMS die CTE is about 2.5. In this example the maximum CTE difference between the components is about 0.75 ppm/K or about 30%.

In contrast, Alloy 42 has a CTE of about 4.9 ppm/K and a more expensive metal like Kovar has a CTE of about 4.5 ppm/K with differences of about 2.4 ppm/K and 2 ppm/K and percentage differences of about 96% and about 80%, respectively.

With such techniques, fluid pressure within an enclosure pressing on the glass pedestal does not transfer this pressure to the MEMS die, but instead only fluid pressure through the fluid conduit 121 creates pressure on the MEMS die 130. Fluid pressure on the pedestal member 120 is received by the mounting frame 105 or flanges of the mounting frame, and that force is transferred to the mounting frame 105.

In some embodiments, the mounting frame 105 defines a recessed opening, that is, recessed relative to the interior side 107 such that the recessed opening protrudes on/above the exterior side 109. The mounting frame 105 can include flange 114 that physically or mechanically holds the pedestal member 120 via pedestal member 120 shoulder 127. In other words, the flange 114 contacts the shoulder 127 such that fluid pressure cannot force the pedestal member 120 through the opening 111. Note that other physical structures or configurations can be used such that the mounting frame 105 mechanically prevents the pedestal member 120 from passing through (completely through) the opening 111. For example, other embodiments can have a mounting frame with a gradually narrowing opening that prevents pedestal member passage. In other embodiments, the pedestal member can be positioned on a generally flat interior side 107, with the mounting frame defining a ridge or other support structure partially surrounding the pedestal member 120 to prevent lateral movement of the pedestal member 120.

In some embodiment, the pedestal member 120 includes a portion that protrudes through the opening 111, as shown in FIG. 1, such that the MEMS die 130 is attached outside of the opening 111. In other words, the MEMS die 130 is attached to the pedestal member 120 such that the MEMS die 130 is positioned slightly above the exterior side 109. In other embodiments, the pedestal member 120 does not protrude through the opening 111, and instead the MEMS die 130 is positioned at least partially within the opening 111.

The pressure sensor device 100 can also include a printed circuit board (PCB) 150 connected to the MEMS die 130, as well as a support member 155 that attaches the printed circuit board 150, and associated structures, to the mounting frame 105. The PCB 150 can be used for signal processing and can include components to implement signal processing. Wire bonds or links can to electrically connect MEMS die 130 to PCB 150. The mounting frame 105 can be comprised of a metallic material such as metal or a metal alloy, and can be selected to match an enclosure material of a fluid-containing enclosure. The mounting frame 105 can be configured to attach to an automotive transmission, and the MEMS die 130 can be configured to monitor oil pressure within the automotive transmission. The MEMS die 130 and printed circuit board 150 can be calibrated to monitor changes in oil pressure from a dual clutch transmission system.

Figure 2:
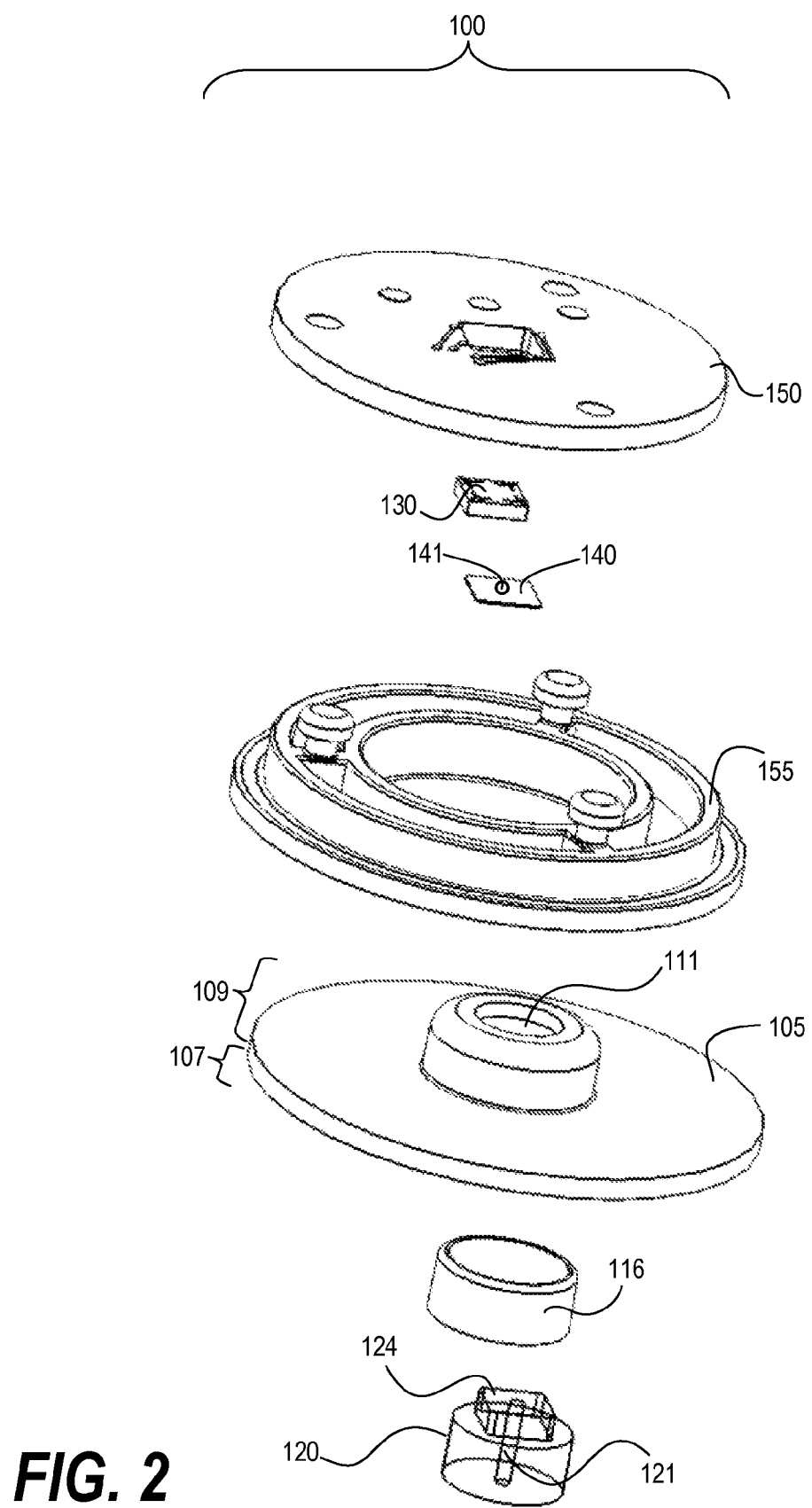
FIG. 2 is a perspective exploded view of example components of a pressure sensor according to embodiments herein.

FIG. 2 shows an exploded perspective view of the components from FIG. 1. Such an exploded view can show an example assembly arrangement. Techniques herein can include a method for assembling a pressure sensor for measuring pressure of a fluid, and a method for measuring pressure using such a pressure sensor. An example method for assembly includes providing a mounting frame 105 attachable to a pressure port of a fluid-containing enclosure. The mounting frame 105 has an interior side 107 for facing the fluid-containing enclosure. The mounting frame 105 has an exterior side 109 for facing away from the fluid-containing enclosure. The mounting frame 105 defines an opening 111 that extends from the interior side 107 to the exterior side 109. A pedestal member 120 is positioned at the opening 111 such that the pedestal member contacts a portion of interior side 107 of the mounting frame 105 such that the mounting frame 105 prevents the pedestal member 120 from completely passing through the opening 111 from the interior side 107 to the exterior side 109. The pedestal member defines a fluid conduit 121 extending completely through the pedestal member 120. The pedestal member 120 is positioned such that the fluid conduit 121 and a surface area 124 of the pedestal member 120, through which the fluid conduit exits, are accessible from the exterior side 109 of the mounting frame 105. Note in the exploded view that the pedestal member 120 is assembled below the mounting frame 105, that is, the pedestal member rests on the interior or oil facing side of the mounting frame 105, in other words, being inserted from the bottom. In conventional pressure sensors, the pedestal member is a metal alloy affixed to the exterior side of a mounting plate, requiring strong adhesive to keep the pedestal member from detaching from the mounting frame.

Either before or after the pedestal member 120 is attached to the mounting frame 105, a microelectromechanical system (MEMS) die 130 is attached to the pedestal member 120 at the surface area 124 of the pedestal member 120 such that when the fluid conduit 121 is filled with fluid from the fluid-containing enclosure, the fluid presses against the MEMS die 130. The pressure sensor device 100 can then monitor changes in fluid pressure and signal associated control systems, such as signaling a pump to increase pressure within the fluid-containing enclosure, or signaling a valve to release excess pressure. Attaching the pedestal member 120 to the mounting frame 105 can be accomplished using a rigid seal 140 that prevents fluid from directly contacting the MEMs die 130 and prevents fluid from exiting the pressure sensor device 100. Such a bonding process can be executed within an oven when using solder glass or paste. The rigid seal 140 can include the thermal expansion properties as explained above. An adhesive seal 116 or other sealant or epoxy can be used to affix the pedestal member 120 within the recessed opening.

Figure 3:
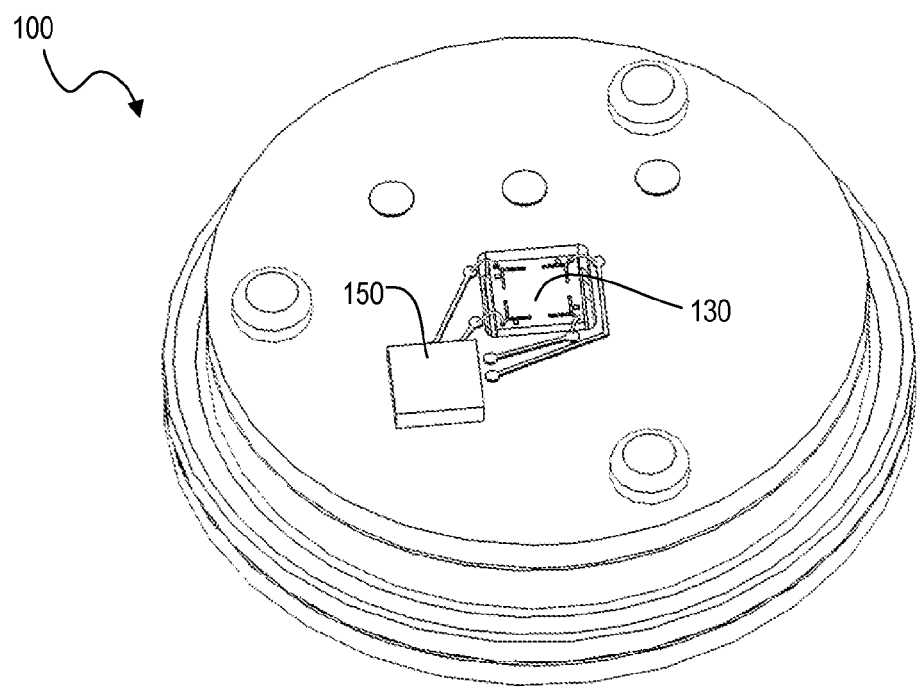
FIG. 3 is a top perspective view of a pressure sensor according to embodiments herein.
Figure 4:
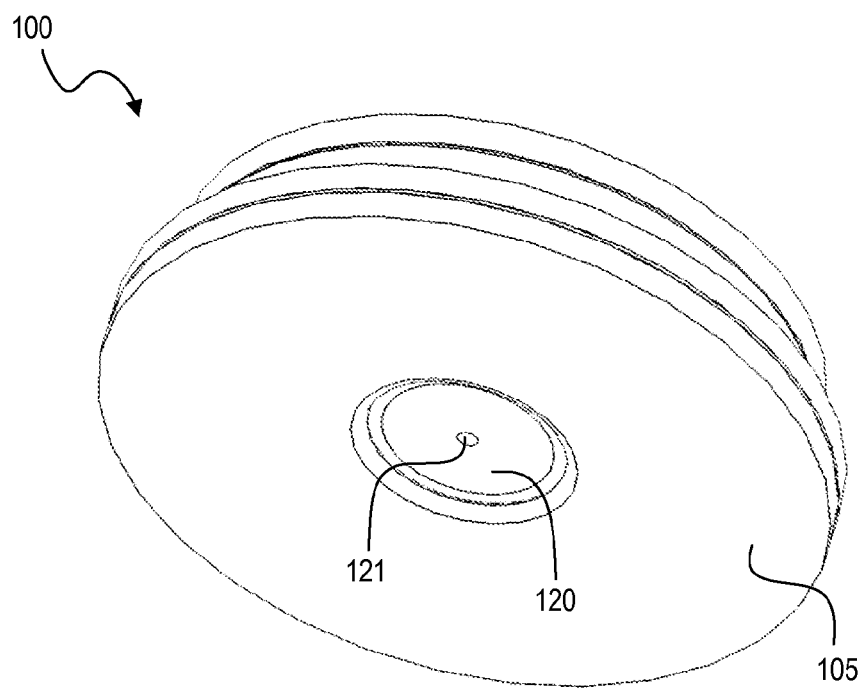
FIG. 4 is a bottom perspective view of a pressure sensor according to embodiments herein.

Referring now to FIGS. 3 and 4, FIG. 3 shows a top perspective view of a pressure sensor device 100. Visible from this view is the MEMS die 130. FIG. 4 shows a bottom view of the pressure sensor device 100. Visible from this view is the fluid conduit 121 through which fluid enters to press against the MEMs die 130. Note that while the pressure sensor device 100 is shown as being generally cylindrical, various geometries can be selected depending on application and design considerations.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A pressure sensor device for measuring pressure of a fluid, the pressure sensor device comprising:
   a mounting frame attachable to a pressure port of a fluid-containing enclosure, the mounting frame having an interior side for facing the fluid-containing enclosure, the mounting frame having an exterior side for facing away from the fluid-containing enclosure, the mounting frame defining an opening that extends from the interior side to the exterior side;
   a pedestal member positioned at the opening and being in contact with a portion of interior side of the mounting frame such that the mounting frame prevents the pedestal member from completely passing through the opening when pressure is exerted on the pedestal member originating from the interior side and pressing the pedestal member towards the exterior side, the pedestal member defining a fluid conduit extending through the pedestal member, the pedestal member positioned such that the fluid conduit and a surface area of the pedestal member, through which the fluid conduit exits, are accessible from the exterior side of the mounting frame; and
   a microelectromechanical system (MEMS) die attached to the pedestal member at the surface area of the pedestal member such that when the fluid conduit is filled with fluid from the fluid-containing enclosure, the fluid presses against the MEMS die.

2. The pressure sensor device of claim 1, wherein the MEMS die is attached to the pedestal member using a rigid seal, the rigid seal having an opening such that the fluid contacts a portion of the MEMS die and preventing fluid from exiting the pressure sensor.

3. The pressure sensor device of claim 2, wherein the rigid seal has a first coefficient of thermal expansion and the MEMS die has a second coefficient of thermal expansion, wherein the first coefficient of thermal expansion and the second coefficient of thermal expansion are within about 0.75 ppm/K of each other.

4. The pressure sensor device of claim 2, wherein the rigid seal forms a bond selected from the group consisting of solder glass bond, eutectic bond, anodic bond, fusion bond, and epoxy bond.

5. The pressure sensor device of claim 2, wherein the rigid seal has a first coefficient of thermal expansion and the MEMS die has a second coefficient of thermal expansion, wherein the first coefficient of thermal expansion and the second coefficient of thermal expansion are within about 2.0 ppm/K of each other.

6. The pressure sensor device of claim 1, wherein the pedestal member is comprised of glass.

7. The pressure sensor device of claim 6, wherein the glass pedestal member is comprised of borosilicate glass.

8. The pressure sensor device of claim 1, wherein the pedestal member is attached to the mounting frame with an adhesive seal.

9. The pressure sensor device of claim 8, wherein the adhesive seal is flexible relative to a rigid seal that attaches the MEMS die to the pedestal member; and
wherein the rigid seal has an opening such that the fluid contacts a portion of the MEMS die and prevents fluid from exiting the pressure sensor.

10. The pressure sensor device of claim 1, wherein the mounting frame defining an opening includes the mounting frame defining a recessed opening relative to the interior side wherein the recessed opening protrudes on the exterior side, the defined opening including a mounting frame flange that contacts the pedestal member and mechanically prevents the pedestal member from passing through the opening.

11. The pressure sensor device of claim 10, wherein the pedestal member includes a pedestal member flange that contacts the mounting frame flange.

12. The pressure sensor device of claim 1, wherein the pedestal member includes a portion that protrudes through the opening such that the MEMS die is attached outside of the opening.

13. The pressure sensor device of claim 1, further comprising:
a printed circuit board connected to the MEMS die; and
a support member that attaches the printed circuit board to the mounting frame.

14. The pressure sensor device of claim 1, wherein a rigid seal connects the MEMs die to the pedestal member, and wherein coefficients of thermal expansion of the pedestal member, the MEMS die, and the rigid seal are all within about 0.75 ppm/K of each other.

15. The pressure sensor device of claim 14, wherein the mounting frame is comprised of a metallic material.

16. The pressure sensor device of claim 14, wherein the mounting frame attaches to an automotive transmission, and wherein the MEMS die is configured to monitor oil pressure within the automotive transmission.

17. The pressure sensor device of claim 16, wherein the MEMS die is calibrated to monitor changes in oil pressure from a dual clutch transmission system.

18. The pressure sensor device of claim 14, wherein the MEMS die further includes a fused glass pedestal.

19. The pressure sensor device of claim 1, wherein a rigid seal connects the MEMs die to the pedestal member, and wherein coefficients of thermal expansion of the pedestal member, the MEMS die, and the rigid seal are within about 2.0 ppm/K of each other.

20. A method for assembling a pressure sensor for measure pressure of a fluid, the method comprising:
providing a mounting frame attachable to a pressure port of a fluid-containing enclosure, the mounting frame having an interior side for facing the fluid-containing enclosure, the mounting frame having an exterior side for facing away from the fluid-containing enclosure, the mounting frame defining an opening that extends from the interior side to the exterior side;
positioning a pedestal member at the opening and such that the pedestal member contacts a portion of interior side of the mounting frame such that the mounting frame prevents the pedestal member from passing through the opening when pressure is exerted on the pedestal member originating from the interior side and pressing the pedestal member towards the exterior side, the pedestal member defining a fluid conduit extending completely through the pedestal member, the pedestal member positioned such that the fluid conduit and a surface area of the pedestal member, through which the fluid conduit exits, are accessible from the exterior side of the mounting frame; and
attaching a microelectromechanical system (MEMS) die to the pedestal member at the surface area of the pedestal member such that when the fluid conduit is filled with fluid from the fluid-containing enclosure, the fluid presses against the MEMS die.

21. The method of claim 20, wherein the MEMS die is attached to the pedestal member using a rigid seal, the rigid seal preventing fluid from directly contacting the MEMs die and preventing fluid from exiting the pressure sensor.

22. The method of claim 21, wherein the rigid seal has a first coefficient of thermal expansion, the MEMS die has a second coefficient of thermal expansion, and the pedestal member has a third coefficient of thermal expansion, wherein the first coefficient of thermal expansion and the second coefficient of thermal expansion and the third coefficient of thermal expansion have values within a predetermined range of coefficient of thermal expansion values.

23. The method of claim 22, wherein the mounting frame defining an opening includes the mounting frame defining a recessed opening relative to the interior side wherein the recessed opening protrudes on the exterior side, the defined opening including a mounting plate flange that contacts the pedestal member and mechanically prevents the pedestal member from passing through the opening.

24. A pressure sensor device for measuring pressure of a fluid, the pressure sensor device comprising:
a mounting frame attachable to a pressure port of a fluid-containing enclosure, the mounting frame having an interior side for facing the fluid-containing enclosure, the mounting frame having an exterior side for facing away from the fluid-containing enclosure, the mounting frame defining an opening that extends from the interior side to the exterior side;
a pedestal member positioned at the opening, the pedestal member defining a fluid conduit extending through the pedestal member, the pedestal member positioned such that the fluid conduit and a surface area of the pedestal member, through which the fluid conduit exits, are accessible from the exterior side of the mounting frame; and
a microelectromechanical system (MEMS) die attached to the pedestal member at the surface area of the pedestal member such that when the fluid conduit is filled with fluid from the fluid-containing enclosure, the fluid presses against the MEMS die; and
a rigid seal comprising solder glass disposed between the pedestal member and the MEMS die, the rigid seal having an opening such that the fluid contacts a portion of the MEMS die and the rigid seal preventing fluid from exiting the pressure sensor.

* * * * *